United States Patent

[11] 3,570,529

| | | |
|---|---|---|
| [72] | Inventor | Lynn I. Pickert<br>Watertown, N.Y. |
| [21] | Appl. No. | 865,670 |
| [22] | Filed | Oct. 13, 1969 |
| [45] | Patented | Mar. 16, 1971 |
| [73] | Assignee | General Signal Corporation |

[54] EMERGENCY VENT VALVE
4 Claims, 2 Drawing Figs.

[52] U.S. Cl. ................................................. 137/494
[51] Int. Cl. ............................................... F16k 31/38
[50] Field of Search .......................................... 137/494

[56] References Cited
UNITED STATES PATENTS
2,861,587  11/1958  Hursen ........................ 137/494
3,165,115  1/1965  Erson ........................... 137/495

Primary Examiner—Harold W. Weakley
Attorney—Dodge and Ostmann

ABSTRACT: A vent valve to provide a local vent from the brake pipe of an automatic air brake system in response to an emergency rate of reduction of brake pipe pressure. The valve is of the poppet type and the valve head is carried by a pivoted actuating lever. The valve head is pivotally connected to the lever and has a pivot axis parallel with the pivot axis of the actuating lever and which is offset from the centerline of the valve seat toward the lever pivot. This location of the valve head pivot affords quick valve opening and good mechanical advantage. The vent valve is spring-biased closed and is opened by a motor which is rendered effective only by a rapid reduction of brake pipe pressure such as is characteristic of an emergency brake application.

Patented March 16, 1971 3,570,529

INVENTOR
LYNN I. PICKERT

BY Dodge & Ostmann
ATTORNEYS

EMERGENCY VENT VALVE

Automatic air brakes are in wide use in the railroad industry. In an automatic air brake system, a so-called brake pipe extends from end to end through the train. The brake pipe serves two basic purposes: (1) as the means through which compressed air is supplied from the locomotive to reservoirs on the individual cars, and (2) as a means to control the actuation of the car-carried control valves which apply and release the brakes.

An emergency application of the brakes may be initiated by opening a large vent from the brake pipe, usually by operation of the engineer's brake valve on the locomotive, though secondary manually operable valves are provided which when operated will cause venting of the brake pipe. To insure rapid venting of the brake pipe on all cars throughout the train, each control valve customarily includes a vent valve which opens in response to the rapid rate of reduction of brake pipe pressure characteristic of emergency venting flow. In recent years, increasing car length and an increasing number of cars in a single train have brought about a need for a second rate responsive brake pipe vent valve on each car.

The present invention concerns an improved vent valve. It is imperative for proper operation of the automatic brake system that the vent valve be reliable in its operation. It must be stable. A service rate of reduction of brake pipe pressure must not produce opening of the vent valve with an attendant, undesired emergency brake application. Also the vent valve must close tightly so that leakage from the brake pipe is avoided.

In the known freight brake equipment using the ABD control valve, there may be provided what is known as an A-1 reduction relay valve. This relay valve is particularly useful on long cars and serves to provide localized venting of brake pipe pressure on each car during both service and emergency brake applications. This localized venting insures serial transmission of the desired brake pipe pressure reduction throughout the train. The relay valve is particularly needed when the control valve on the car (or on a series of cars) has been cut out. The relay valve includes a No. 8 Vent Valve Portion which, if adjacent control valves are cutout due to faulty action, provides high rate venting of the brake pipe to insure the serial transmission of an emergency rate of brake pipe reduction. This vent valve also augments the emergency vent valve included in the ABD control valve. It can be used in systems including other control valves, such as the AB control valve.

The No. 8 Vent Valve Portion includes a vent valve which is a spool valve and is essentially pressure balanced, and the valve is spring-biased closed. A motor is provided to open the vent valve, and it is sufficiently energized only when an emergency rate of brake pipe pressure reduction occurs.

According to the present invention, the vent valve is formed as a poppet valve A poppet valve is not a pressure-balanced valve. Since the vent path opened by the vent valve must be large, the pressure force holding the vent valve closed is high. Despite this apparent drawback, a poppet type valve offers quick opening and requires no lubrication. A lubricated valve, such as the spool valve of the known No. 8 Vent Valve is undesirable in train equipment because the lubricant traps dirt and dust which may cause sticking of the valve.

The poppet valve of the present invention is actuated by a lever. This lever is pivotally mounted in the valve chamber of the vent valve. The vent valve poppet is pivotally supported by this lever between the lever pivot and the actuating motor. The axis of the poppet pivot is displaced from the centerline of the valve seat toward the lever pivot. Thus, when the lever moves the valve from its seat, the valve tilts about a point on the side of the valve seat remote from the lever pivot. This results in a reduction in the force initially required to crack open the poppet valve. The valve, when cracked open, increases the rate of brake pipe reduction, and the force developed by the air motor, thus insuring quick and full poppet valve opening. The location of the poppet valve pivot close to the lever pivot affords a favorable mechanical advantage for the actuating motor. As a result of this arrangement of the parts, the poppet valve can be initially unseated by the same motor force as was required by the balanced spool of the known valve. At the same time, the overall size of the Vent Valve Portion is unchanged, and the entire vent valve assembly can be mounted on the conventional pipe bracket. This is an important consideration because it simplifies changeover.

DESCRIPTION OF THE PREFERRED EMBODIMENT

The preferred embodiment of the invention will be described herein having reference to the accompanying drawing, in which.

Figures 1, 2:
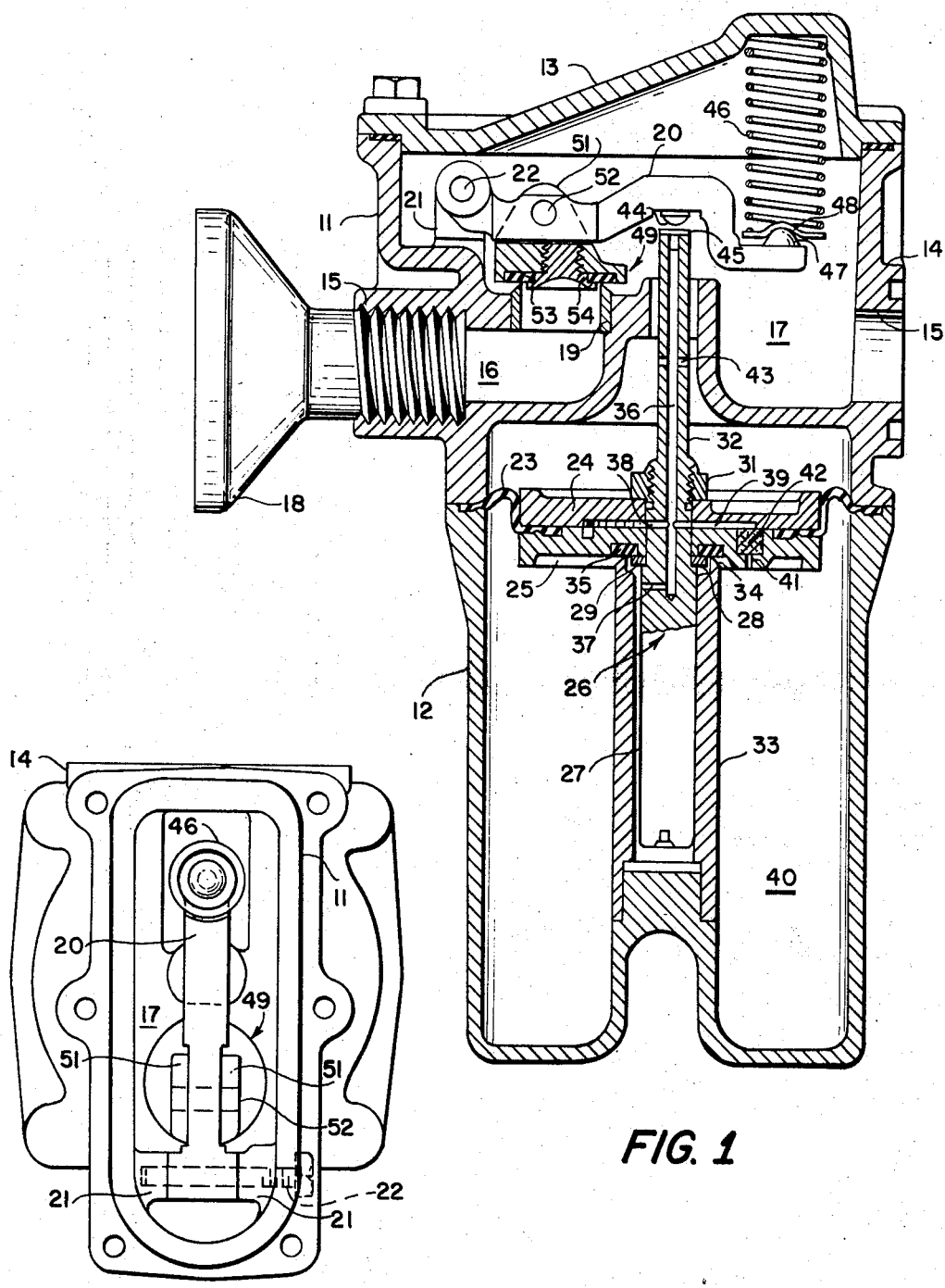
FIG. 1 is an axial section of the vent valve assembly.
FIG. 2 is a top plan view of the vent valve assembly with the cover and the vent protector removed.

The valve assembly has a three-part housing which includes a valve chamber portion 11, a motor chamber portion 12 and a cover 13. The valve chamber portion 11 is provided with a mounting flange 14 by which the valve assembly can be connected to the conventional pipe bracket (not shown) of the known A-1 Reduction Relay Valve. A port 15 extends through the flange and is connected by ports in the pipe bracket to the brake pipe. A vent 16 extends outward from valve chamber 17. Vent 16 is provided at its outer end with a vent protector 18 of conventional form. A valve seat 19 is pressed into an annular recess provided at the inner end of the vent 16. A pair of lugs 21 project from the inner wall of the valve chamber portion 11 and support a pivot pin 22 on which a valve actuating lever 20 is mounted.

A slack annular diaphragm 23 is clamped at its outer periphery between the valve chamber portion 11 and the motor chamber portion 12. The inner periphery of diaphragm 23 is clamped between apertured follower plates 24 and 25. A combined thrust rod and guide stem 26 is supported by apertured followers. The guide portion 27 has a shoulder 28, and a suitable valve insert retaining ring 29 is provided between the shoulder and the follower plate 25. A nut 31 is threaded onto thrust rod 32 and serves to clamp the plates 24 and 25 together. Combined guide sleeve and valve seat 33 is mounted in the motor portion 12 and surrounds the guide stem 27. The end of the sleeve has a conical valve seat 34. A rubber valve insert 35 is received in an annular recess formed in follower plate 25 and engages seat 34. A longitudinal passage 36 is formed in thrust rod 32. A cross-bore 37 extends from passage 36 to the space between guide stem 27 and guide sleeve 33. A plurality of cross-bores 38 connect between the passage 36 and an annular recess 39 in the follower plate 24. A metering port 41 extends through plate 25 and affords communication between recess 39 and motor chamber 40. A filter element 42 is provided in an enlarged portion of port 41. Cross-bores 43 in thrust rod 32 provide a flow communication between passage 36 and valve chamber 17.

Lever 20 carries a thrust pad or button 44 positioned to engage the hardened insert 45 mounted in the end of thrust rod 32. A spring 46 reacts between seats in cover 13 and on the free end of lever 20. The spring seat on the lever 20 comprises a generally semispherical boss 47 and plate 48 having a central concave recess in which the boss is received. The thrust surface of pad 44 and the center of boss 47 preferably lie on a common radius. The angular displacement of the lever 20 from the horizontal in valve closing position is equal to its angular displacement from the horizontal in open position of the valve. This minimizes lateral displacement of the spring seat and of thrust pad 44.

Lever 20 carries a valve member 49 comprising a generally cylindrical body portion from which attaching lugs 51 project. A pivot pin 52, parallel with pin 22, extends through lugs 51 and lever 20. A rubber valve insert 53 is mounted in a recess in valve member 49 and is secured in place by screw 54. The axis of pivot pin 52 is displaced from the center line of valve seat 19 toward pivot 22.

OPERATION

Assuming that the automatic brake system is uncharged, spring 46 will bias valve member 49 against seat 19, closing vent 16. Thus, when charging of the brake pipe commences, air under pressure will enter valve chamber 17 through port 15. The pressure thus developed assists in holding valve 49 closed and reacts against diaphragm 23 urging the thrust rod 32 away from lever 20 and against valve seat 34. Port 37 will be able to maintain the pressure in the clearance space between guide sleeve 33 and guide stem 27 equal to that in chamber 17. Pressure in motor chamber 40 will develop at a lower rate, because of the metering port 41. Thus, the thrust rod will be held retracted throughout the charging cycle, until brake pipe charging flow terminates, at which time equalization of the pressure in chambers 17 and 40 will have occurred.

When brake pipe pressure is reduced to apply the brakes, the pressure in chamber 17 which communicates with the brake pipe will also be reduced. The pressure in chamber 17 will fall more quickly than that in chamber 40 because of the restricted area of port 41 and cross-bore 37. Spring 46 and the unbalanced pressure force acting on valve 49 will control travel of the diaphragm 23. If brake pipe pressure is being reduced at a rate characteristic of a service application, the unbalance between the pressure forces on diaphragm 23 will not become so large as to cause the vent valve 49 to open. When the brake pipe pressure reaches the reduced value characteristic of the degree of braking desired by the engineer, the pressures in chambers 17 and 40 will again equalize. During release of a service application of the brakes, the brake pipe is charged to restore pressure to its normal level. Because of the limited flow capacity of ports 37 and 41, the diaphragm and valve insert 35 will move into contact with valve seat 34. Motor chamber 40 pressure buildup, which is now controlled by port 41, will therefore develop more slowly than that in chamber 17. This is a desirable feature, since, during charging of the brake pipe, pressure waves may occur which cause transitory localized reductions in the pressure. The motor must be stable and not unseat the vent valve 49 in response to such transitory low pressure in chamber 17. These pressure waves occur particularly during the initial period of brake pipe pressure restoration. The pressures in motor chamber 40 and valve chamber 17 will be equalized when the brake pipe is fully recharged.

If the brake pipe pressure is reduced at the high rate characteristic of an emergency brake application, the unbalance between the pressure in chambers 17 and 40 will quickly become large enough to overcome the pressure forces holding valve 49 to its seat and the force of spring 46. Initial movement of lever 20 will cause the valve to tilt around the edge of seat 19 which is remote from pivot 22. The force required to cause such tilting of valve 49 is less than the force which would be required to unseat a poppet valve is the lifting force had been applied along the centerline of valve seat 19. By displacing pivot 52 toward the pivot 22, the mechanical advantage is increased as contrasted to that which would have resulted had pivot 52 been shifted away from pivot 22. The initial tilting movement of valve 49 opens a flow path through vent 16 and thereby increases the rate of brake pipe reduction, and the force developed by the air motor. This insures quick, full opening of the poppet valve to vent the brake pipe. The serial transmission of the emergency rate of brake pipe pressure reduction through the train is insured and hastened.

With the brakes fully applied, the pressure remaining in motor chamber 40 will flow through port 41, until the spring 46 can move lever 20 to its vent valve closing position. This insures that the vent valve will remain open until the emergency application is complete throughout the train.

The vent valve can be installed in the illustrated position, but is indifferent to being inverted, since diaphragm 23 moves in response to a slight pressure differential in either direction to assume the initial position desired during release or application of the brakes. The illustrated position was selected only for easy understanding.

I claim:

1. An emergency vent valve, for use in an automatic fluid pressure brake system of the type including a train-lined brake pipe, comprising:
   a. a housing (11, 12, 13) enclosing a chamber;
   b. a movable abutment (23, 24, 25) dividing said chamber into a valve chamber (17) and a motor chamber (40);
   c. means (41) affording limited flow between said valve and motor chambers;
   d. an inlet (15) to said valve chamber for connection to the brake pipe;
   e. an atmospheric vent (16) of large cross-sectional area opening from said valve chamber;
   f. a valve seat (19) in said vent;
   g. an actuating lever (20) pivotally mounted in the valve chamber for movement in a plane perpendicular to said valve seat;
   h. a poppet valve member (49) pivotally connected to said lever and seatable on said valve seat, the axis of the valve member pivot (52) being parallel with the axis of the lever pivot (22) and lying between that pivot and the centerline of said valve seat;
   i. yielding means (46) biasing said valve member toward said seat; and
   j. means (32) reacting between said lever and said movable abutment and serving to move the valve member from said seat when the pressure in said motor chamber exceeds that of the valve chamber by more than a predetermined amount.

2. The combination defined in claim 1 in which:
   a. the yielding means (46) is a spring, mounted to react between a seat (47) at the free end of said lever and the housing; and
   b. the means reacting between the lever and the abutment is a thrust rod mounted on the abutment and engageable with a thrust plate formed on the lever between its free end and the valve member pivot axis.

3. The combination defined in claim 2 in which the thrust rod and the spring are arranged so as to produce forces acting tangentially to the arcs along which said valve member pivot and said plate move during pivotal movement of the lever, the points of tangency being at the midpoints of said arcs.

4. The combination defined in claim 3 in which said points of tangency lie on a common radius.